(12) United States Patent
de Abrêu Macêdo et al.

(10) Patent No.: US 7,071,438 B2
(45) Date of Patent: Jul. 4, 2006

(54) GAS COMPOSITION FOR ARC WELDING

(75) Inventors: William de Abreu Macêdo, Grajau—Rio de Janeiro—RJ (BR); Joáo Vinicius de Oliveira Correia, Icarai—Niteroi—RJ (BR)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/384,907

(22) Filed: Mar. 7, 2003

(65) Prior Publication Data

US 2004/0173593 A1  Sep. 9, 2004

(51) Int. Cl.
B23K 9/173 (2006.01)

(52) U.S. Cl. .................. 219/74; 219/137 WM

(58) Field of Classification Search ................ 219/74, 219/137 PS, 137 WM
See application file for complete search history.

(56) References Cited

U.S. PATENT DOCUMENTS

| 4,912,299 A | 3/1990 | Oros et al. |
|---|---|---|
| 5,210,388 A | 5/1993 | Farwer |
| 5,558,791 A | 9/1996 | Fawer |
| 5,609,783 A | 3/1997 | Fawer |
| 5,667,702 A | 9/1997 | Soula et al. |
| 5,667,703 A | 9/1997 | Soula et al. |
| 6,111,218 A | 8/2000 | Matile et al. |
| 6,376,802 B1 * | 4/2002 | Tong et al. ............ 219/137 PS |
| 6,392,194 B1 | 5/2002 | Fortain et al. |
| 2002/0036186 A1 | 3/2002 | Fortain et al. |

* cited by examiner

*Primary Examiner*—Clifford C. Shaw
(74) *Attorney, Agent, or Firm*—Gerald L. Coon

(57) ABSTRACT

The disclosed invention is a composition and process for employing a shielding gas in arc welding. The disclosed composition includes oxygen in an amount between about 0.6% and about 1.9%, helium in an amount between about 10% and about 24%, and the remainder consisting essentially of argon. The invention can be used in high-speed automated welding to result in significantly improved welding speed, joint fit-up tolerance, and burn-through minimization while maintaining excellent mechanical characteristics.

8 Claims, No Drawings

GAS COMPOSITION FOR ARC WELDING

BACKGROUND OF THE INVENTION

Gas metal arc welding (GMAW) is commonly used to join pieces of metal in high throughput production environments, particularly assembly lines employing automated or robotic welders. A challenging application of such processes is to weld relatively thin pieces of metal together, in particular aluminum or aluminum alloys. One critical issue is obtaining sufficient penetration of each workpiece by the liquid metal without creating over-penetration or "burn-through." A second critical issue is creating a weld that can span variations in alignment gaps between workpieces, or joint "fit-up". These issues are intertwined by the fact that higher voltage, which generally leads to welds that can span larger gaps, will in turn lead to greater burn-through. A third issue is solving these problems while simultaneously maintaining or increasing welding speed and weld mechanical properties. A fourth issue is providing a solution for the above problems that is compatible with direct current (DC) welding and alternating current (AC) welding.

Attempts have been made to solve these intertwined problems. One technique involves using alternative shielding gas compositions. GMAW, by definition, uses a gas to control the atmosphere around the weld, excluding species that react with the liquid metal. For example, a shield gas can be high purity argon (99.997% pure, <5 ppm water). Recently, small amounts of other species, for example nitrogen, oxygen, nitrous oxide, and carbon dioxide have been combined with noble gases in shielding gas compositions. The non-noble gases are used in amounts from about 200 ppm to about 1,200 ppm. These attempts have led to improvements in arc stability in direct current GMAW, but still leave issues with burn-through unresolved, particularly with respect to variations in joint fit-up.

Another attempt to solve the problem employs alternating current, and means to minimize variations in the arc current. This results in minimized burn-through but does not address the issue of tolerating variations in joint fit-up.

One attempt to solve these problems involves using a shielding gas composed of a noble gas and other reactive gases in the several hundred parts per million range (ppm).

Another technique involves using alternating current to generate the arc, and controlling the alternating current to control penetration depth. Although this reduces burn-through, field experience indicates that assembly lines incorporating these systems must be run at a slower speed.

Yet another attempt proposes a small amount of oxygen combined with a range of helium between about 10% and about 98%, with the balance being argon. However, helium and argon have substantially different effects on weld properties. For example, bead size in the resulting weld varies with helium concentration. This affects burn-through, the ability to span various joint gaps, and consequently the maximum welding speed achievable at a given weld quality level. The relationship between these quantities as a function of helium concentration is not taught by this proposal. Furthermore, the proposal teaches the use of only a limited frequency range of alternating current. Thus, this proposal does not teach an understanding of, or a solution to, the present problem.

There is therefore a need for a high-speed welding process that can weld a variety of joint gaps on relatively thin workpieces, while simultaneously minimizing burn-through and maintaining or increasing weld mechanical properties.

SUMMARY OF THE INVENTION

Disclosed herein is a novel shielding gas composition for use in a GMAW process. See Examples 1, 2, and 3 in the Exemplification.

One embodiment of the invention is a shielding gas composition for arc welding, comprising oxygen ($O_2$) in an amount between about 0.6% to about 1.9%, helium in an amount between about 10% and about 24%, and the remainder consisting essentially of argon. Another embodiment is a method for gas metal arc welding, comprising the step of employing the disclosed composition.

The advantages of the invention disclosed herein are numerous and significant. By combining two noble gases with a surprisingly large amount of a reactive gas, an assembly line using the invention can be run at a higher speed. The invention allows a GMAW process to accommodate wide variation in joint fit-up while simultaneously avoiding burn-through. The invention also allows higher speed operation compared to existing processes. The invention further is compatible with both direct current and alternating current processes, providing greater flexibility in choice of welding apparatus, workpiece specifications, and operating conditions. The invention also solves these problems while still providing good mechanical properties in the weld. The disclosed composition can also employ lower purity, i.e., cheaper gases.

DETAILED DESCRIPTION OF THE INVENTION

The foregoing and the objects, features, and advantages of the invention will be apparent from the following particular description of the preferred embodiments of the invention. All percentages and parts for gases are by volume unless otherwise indicated. All the percentages and parts for liquids and solids are by weight unless otherwise indicated.

The invention is generally related to GMAW processes. In particular, the invention is related to shielding gas compositions used in welding thin workpieces, especially aluminum and aluminum alloys, in a high-throughput assembly line.

Arc welding is the process of maintaining an electric arc between one or more workpieces and a consumable electrode. The electric arc transforms the electrode into liquid metal droplets, which are then transferred to the workpiece. A strong weld forms when this liquid metal penetrates the metal of the workpiece before solidifying, but not so much that it leads to burn-through.

By definition, GMAW processes employ a gas. This gas, also known as a shielding gas, is used to control the atmosphere in the vicinity of the weld. The gas provides a barrier to the surrounding environment, excluding or controlling the presence of species that could react with the liquid metal of the weld, for example, water or oxygen. At the high temperatures employed in welding, even typically unreactive gases such as nitrogen and carbon dioxide can react with the liquid metal. Thus, the classic example of a shielding gas is a noble gas such as argon or helium, or a combination of the two.

The makeup of a shielding gas, in combination with the metal being welded, determines many characteristics of the weld that is formed. Droplet size, metal transfer rate, porosity of the weld, and the like are influenced by these parameters. The relationships between the conditions of a welding process, however, and the properties of the resulting weld are not well understood in a predictive or theoretical sense.

As a result, development of new process conditions generally requires extensive experimental effort and practical experience.

The disclosed composition employs helium and oxygen in an argon carrier gas. Addition of the helium demands a higher voltage for the arc column, i.e., the combined conduction path of the arc and the path of the liquid metal being transferred from the consumable electrode to the workpiece. This leads to a larger bead at the weld, which means that a larger variation in joint fit-up can be successfully welded. The oxygen addition increases the fluidity of the weld pool and decreases the droplet size of the metal in the arc column. This leads to higher metal transfer rates and a faster process.

The amount of oxygen in the disclosed composition that leads to these results is surprisingly large for two reasons. First, the traditional rationale for an inert shielding gas suggests that large amounts of a reactive gas would lead to unacceptable reaction with the liquid metal. Furthermore, in cases where reactive gases have been used, the amount is relatively small, on the order of 1,200 ppm for relatively unreactive gases, such as nitrogen and carbon dioxide, and lower amounts, on the order of 200 ppm for more reactive species, such as nitrous oxide. Compared to relatively unreactive gases, the oxygen in the invention is between about 4 to about 16 times greater; compared to reactive gases, oxygen in the invention is between about 25 to about 100 times greater.

In an alternative embodiment, the amount of oxygen is about 1%. In another variation, the amount of helium is about 20%. Alternatively, the amount of oxygen is about 1% and the amount of helium is about 20%.

In preliminary experiments, the argon carrier gas was tested at two different purity levels, 99.997% pure (<5 ppm water) and 99.995% pure (<10 ppm water), which led to essentially the same results. Thus, another embodiment of the invention is a composition wherein the purity of the argon component is at least about 99.995% pure.

In an embodiment of the method of the invention, direct current is used to generate the arc. In another embodiment, alternating current is used to generate the arc. In yet another embodiment, the method is used to weld metals including aluminum and aluminum alloys. An aluminum alloy includes, for example, AA5052-H34 and AA6063-T5, or any other electrodes from the 4000, 5000, and 6000 series.

EXEMPLIFICATION

The present invention is illustrated by the following examples, which are not intended to be limiting in any way.

In these examples, the following conditions were used. Test workpieces were 3 mm thick, 400 mm long, and 150 mm wide. Welds were performed on a butt joint between the 3mm×400 mm faces of two adjoining workpieces. The distance between the two faces constitutes the joint gap, which was tested from about 0 to about 2 mm. Two different aluminum alloys were tested, AA5052-H34 and AA6063-T5. Welds were performed using a robotic welder (model SK6, Motoman, Inc., West Carrolton, Ohio) employing current and voltage parameters indicated in the following data tables. The consumable electrode used was 0.045" (1.14 mm) diameter AA5183 filler wire (manufactured by Natweld/Inweld Indianapolis, Ind.; composition Mn-0.74%; Cr-0.07%; Zn-0.01%; Fe-0.13%; Cu-0.01%; Si-0.38%; Mg-5.09%; Al-balance. Examination of the resulting welds was performed according to specifications regarding metallurgical characteristics including macro and microstructural analysis and determination of microhardness profiles described in the Aluminum Structural Welding Code (publication #AISI/AWS DI.2-97 American Welding Society, Miami, Fla.), the entire teachings of which are incorporated herein by reference. The gas compositions include the indicated percentages of helium and oxygen, with the balance being argon of at least 99.995% purity (<10 ppm water).

EXAMPLE 1

Pulsed Direct Current GMAW Experiment Speed Results

| Alloy | Gases | Current, amps | | | Voltage | | | Welding speed, cm/min |
|---|---|---|---|---|---|---|---|---|
| | | Base | Peak | Avg | Base | Peak | Avg | |
| AA6063-T5 | Ar | 61 | 260 | 165 | 16.8 | 25.0 | 20.1 | 90 |
| | Ar, 25% He | 53 | 260 | 161 | 17.0 | 24.8 | 20.7 | 100 |
| | Ar, 25% He, 1% $O_2$ | 56 | 283 | 184 | 11.8 | 28.3 | 21.3 | 125 |
| AA5052-H34 | Ar | 45 | 268 | 159 | 13.1 | 27.2 | 20.4 | 100 |
| | Ar, 25% He | 46 | 270 | 163 | 14.6 | 28.1 | 20.3 | 110 |
| | Ar, 25% He, 1% $O_2$ | 43 | 283 | 175 | 15.8 | 29.0 | 21.8 | 140 |

EXAMPLE 2

Pulsed Alternating Current GMAW Experiment Speed Results

| Alloy | Gases | Current, amps | | | Voltage | | | Reverse Polarity Time, s | Welding speed, cm/min |
|---|---|---|---|---|---|---|---|---|---|
| | | Base | Peak | Avg | Base | Peak | Avg | | |
| AA6063-T5 | Ar | 26 | 250 | 168 | 15.5 | 23.0 | 20.3 | 1.7 | 105 |
| | Ar, 25% He | 26 | 260 | 180 | 15.8 | 22.9 | 21.0 | 1.6 | 105 |
| | Ar, 25% He, 1% $O_2$ | 25 | 280 | 188 | 15.4 | 25.5 | 20.9 | 1.2 | 120 |

EXAMPLE 2-continued

Pulsed Alternating Current GMAW Experiment Speed Results

| Alloy | Gases | Current, amps | | | Voltage | | | Reverse Polarity Time, s | Welding speed, cm/min |
|---|---|---|---|---|---|---|---|---|---|
| | | Base | Peak | Avg | Base | Peak | Avg | | |
| AA5052-H34 | Ar | 26 | 293 | 163 | 14.6 | 25.5 | 20.3 | 1.7 | 105 |
| | Ar, 25% He | 25 | 297 | 161 | 16.9 | 25.5 | 20.9 | 1.7 | 105 |
| | Ar, 25% He, 1% O$_2$ | 19 | 283 | 176 | 16.1 | 28.5 | 23.4 | 1.9 | 160 |

EXAMPLE 3

Mechanical Test Results for AC and DC GMAW Experiments

| Alloy | Gases | Current Type | Tensile Strength, MPa | AISI/AWS Bend Test |
|---|---|---|---|---|
| AA6063-T5 | Ar | DC | 129.5 | Pass |
| | Ar | AC | 125.0 | Pass |
| | Ar, 25% He | DC | 127.5 | Pass |
| | Ar, 25% He | AC | 122.1 | Pass |
| | Ar, 25% He, 1% O$_2$ | DC | 137.2 | Pass |
| | Ar, 25% He, 1% O$_2$ | AC | 126.4 | Pass |
| | None (alloy alone) | — | 115.0 | |
| AA5052-H34 | Ar | DC | 198.5 | Pass |
| | Ar | AC | 195.1 | Pass |
| | Ar, 25% He | DC | 182.9 | Pass |
| | Ar, 25% He | AC | 199.0 | Pass |
| | Ar, 25% He, 1% O$_2$ | DC | 202.9 | Pass |
| | Ar, 25% He, 1% O$_2$ | AC | 206.0 | Pass |
| | None (alloy alone) | — | 170.0 | |

While this invention has been particularly shown and described with references to preferred embodiments thereof, it will be understood by those skilled in the art that various changes in form and details may be made therein without departing from the scope of the invention encompassed by the appended claims.

What is claimed is:

1. A high speed method for gas metal arc welding joint gaps on aluminum and aluminum alloy thin workpieces without creating burning-through, which comprises conducting said gas metal arc welding employing a shielding gas, wherein said shielding gas comprises:
   a) oxygen in an amount between about 0.6% and about 1.9%;
   b) helium in an amount between about 10% and about 24%; and
   c) the remainder consisting essentially of argon;
and employing direct current or alternating current to generate the arc; wherein the amount of helium is sufficient to provide a bead size that can weld joint gaps between said aluminum arid aluminum alloy thin workpieces without creating burn-through, while simultaneously maintaining or increasing welding speed, and wherein the welding speed is greater than about 110 cm/min for gas metal arc welding employing direct current to generate the arc, and greater than about 105 cm/min for gas metal arc welding employing alternating current to generate the arc.

2. The method of claim 1, wherein the amount of helium is about 20%.

3. The method of claim 1, wherein the amount of oxygen is about 1%.

4. The method of claim 3, wherein the amount of helium is about 20%.

5. The method of claim 1, wherein the purity of the argon component is at least about 99.995%.

6. The method of claim 1, wherein the amount of helium is sufficient to provide a bead size which achieves sufficient penetration of said aluminum and aluminum alloy thin workpieces without creating burn-through and which creates a weld that can span variations in alignment gaps between said aluminum and aluminum alloy thin workpieces or joint fit-up, while simultaneously maintaining or increasing welding speed and weld mechanical properties.

7. The method of claim 1, wherein said aluminum and aluminum alloy thin workpieces are at least 3 mm thick.

8. The method of claim 1, wherein the joint gaps range in distance from about 0 to 2 mm or greater.

* * * * *